April 8, 1958 — J. W. TITUS — 2,830,293
VIBRATION ISOLATION SYSTEM
Filed Oct. 31, 1956 — 3 Sheets-Sheet 1

INVENTOR
JAMES W. TITUS

BY *W. R. Maltby*
*Richard C. Reed*
ATTORNEYS

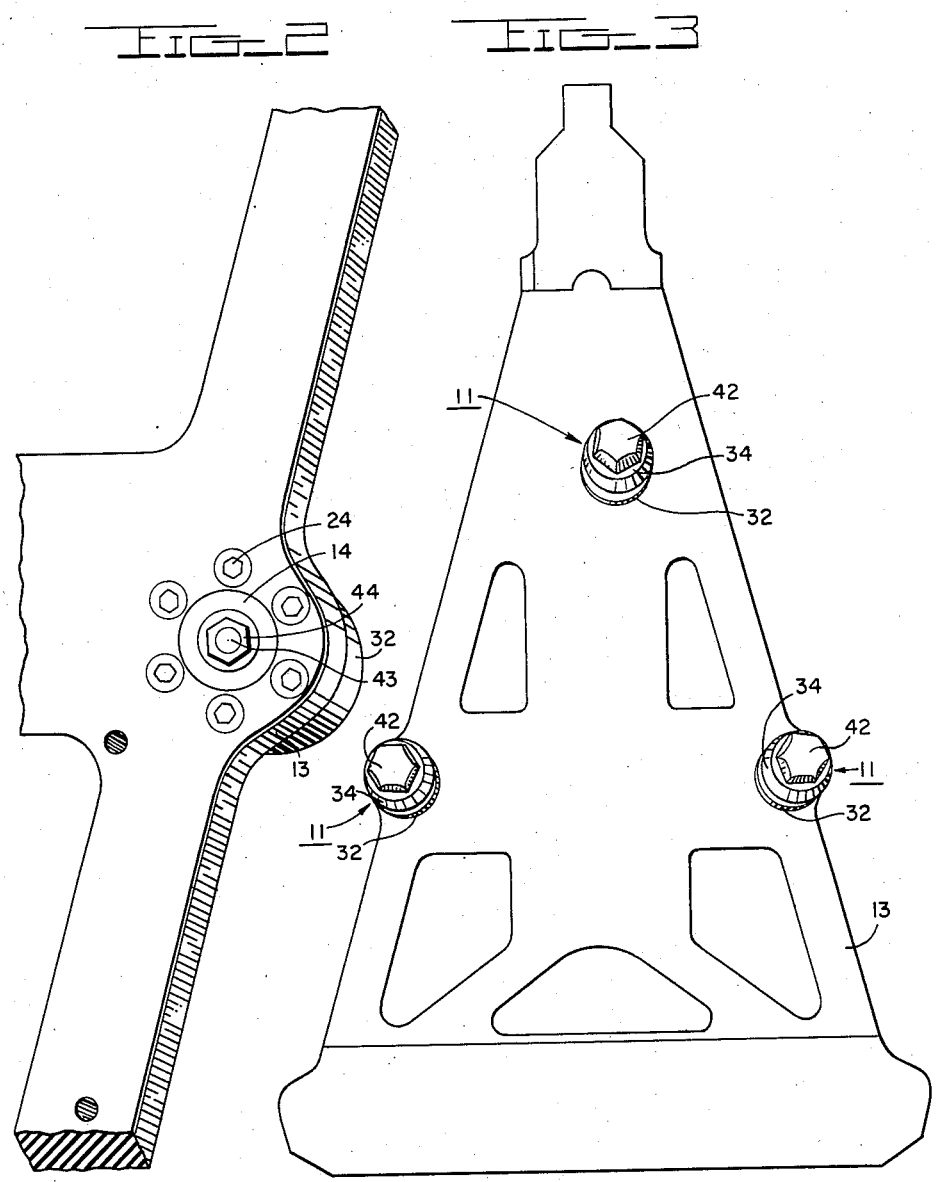

April 8, 1958  J. W. TITUS  2,830,293
VIBRATION ISOLATION SYSTEM
Filed Oct. 31, 1956  3 Sheets-Sheet 3

INVENTOR
JAMES W. TITUS

BY
ATTORNEYS

United States Patent Office 2,830,293
Patented Apr. 8, 1958

2,830,293
VIBRATION ISOLATION SYSTEM

James W. Titus, Washington, D. C., assignor to the United States of America as represented by the Secretary of the Navy Application October 31, 1956, Serial No. 619,649

8 Claims. (Cl. 343—878)

(Granted under Title 35, U. S. Code (1952), sec. 266)

The invention described herein may be manufactured and used by or for the Government of the United States of America for governmental purposes without the payment of any royalties thereon or therefor.

The present invention relates to a vibration isolation system and more particularly to such a system which will isolate an object from vibrations and shocks and will simultaneously maintain a reference plane passing through the object parallel to a reference plane passing through the structure on which the object is mounted despite a displacement of the object relative to the mounting structure.

Although the vibration isolation system of this invention has application in any environment where an object must be isolated from vibration and simultaneously remain parallel to its original position in relation to the structure upon which it is mounted, it is particularly useful in isolating a radar antenna from environmental vibrations and shocks without permitting a shift in bore-sight.

A radar antenna mounted on a moving vehicle will be subjected to vibrations and shocks caused by a sudden displacement of the vehicle out of its normal path of movement. When the vehicle is so displaced, it is either accelerated or decelerated in the direction of the displacement and this causes a force to be exerted on the antenna because of its inertia. Such forces will tend to cause the antenna to move in relation to the vehicle body and as a consequence severe stresses and strains may be set up in the antenna and antenna mounting structure. These vibrations may also cause malfunctioning of an antenna system which has gyrocomputers associated therewith as the small rapid movements of the antenna caused by the vibrations have a tendency to saturate the gyrocomputers and render them inoperative. Also the bore-sight of the antenna may be shifted through a certain angular displacement in relation to the vehicle upon which it is mounted and thus the radar associated with the antenna may give an erroneous indication of the position of the target.

The present invention seeks to obviate these difficulties by mounting the antenna on a vehicle by means of three or more double cantilever beams or spring which are sufficiently flexible to permit lateral displacement of the antenna base with respect to the vehicle when the vehicle is subjected to vibrations. The beams or springs are very stiff in an axial direction and this coupled with the double cantilever action prevents the angle between a given reference plane in the antenna and a given reference plane in the vehicle from changing. The antenna base will remain parallel to its original position with respect to the given reference plane in the vehicle while being laterally displaced in relation to said vehicle as the result of vibrations or shocks. Thus, the vibration isolating system of the present invention will effectively isolate the antenna from vibrations and simultaneously prevent any change in the angle between the bore-sight and the given reference plane in the vehicle.

An object of the present invention is the provision of a vibration isolation system which will effectively isolate an object from environmental vibrations and shocks.

A further object of the invention is to provide a vibration isolation system which will maintain a reference plane passing through the object to be isolated from vibration parallel to a reference plane passing through the mounting for said object.

A further object of the invention is the provision of a vibration isolation system for a radar antenna which will isolate the antenna from environmental vibrations and shocks without permitting a shift in bore-sight.

Still another object of the invention is the provision of a vibration isolation system for an antenna which will effectively isolate the antenna from environmental vibrations and shocks by permitting a lateral displacement of the antenna with respect to a vehicle upon which it is mounted while simultaneously maintaining a reference plane passing through the antenna parallel to a reference plane passing through the vehicle.

Other objects and many of the attendant advantages of this invention will be readily appreciated as the same becomes better understood by reference to the following detailed description when considered in connection with the accompanying drawings in which like reference numerals designate like parts throughout the figures thereof and wherein:

Fig. 2 is a back elevational view of the cantilever beam assembly of Fig. 1 without the base member mounted thereon.

Fig. 3 is a front elevational view of three of the double cantilever beam assemblies of Fig. 1 mounted in a structural member of an airplane.

Figure 1:
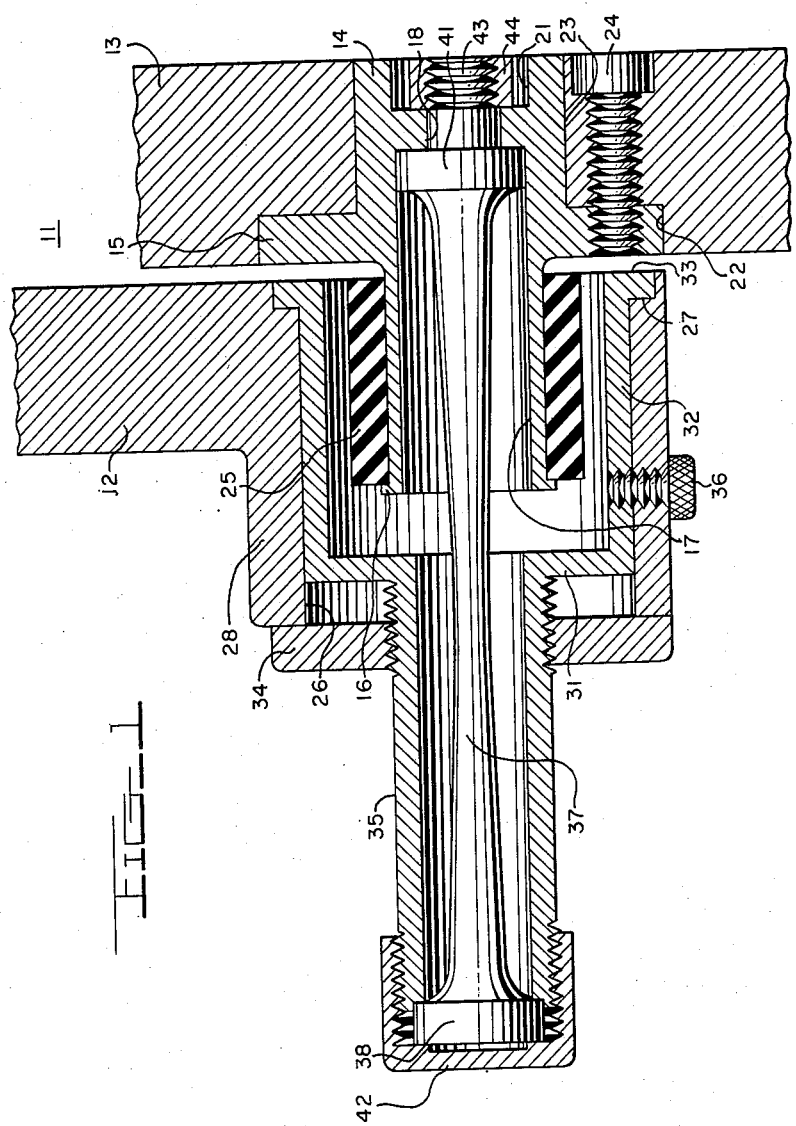
Fig. 1 is a cross sectional view of a double cantilever beam assembly constructed in accordance with the principles of the invention.

Referring now to the drawings, there is shown in Fig. 1 a double cantilever beam assembly generally designated by the numeral 11 for use in supporting a base member 12, such as as an antenna base or the like on a structural member 13, such as a structural A frame of an aircraft or the like, and for isolating the vibrations and shocks experienced by the structural member 13 from the base member 12. As shown in Fig. 3 at least three of these double cantilever beam assemblies are used in the vibration isolation system of the invention. A double cantilever beam is one in which the beam is firmly fixed at each end so that the supports completely restrain the inclination of the beam at both ends. If a reference axis is taken through the longitudinal axis of the beam, the slope of the beam at each end will be zero with respect to this axis after loading. A joint or connection which will so restrain the beam is known as a fixed joint.

Describing now the construction of one double centilever beam assembly as shown in Figs. 1 and 2, a bushing 14 constructed of stainless steel or other suitable metal and having flanges 15 and 16, and coaxial bores 17, 18 and 21 is positioned in suitable coaxial bores 22 and 23 in the structural member 13. The bushing 14 is attached to the structural member 13 by a plurality of machine screws 24 which are screwed into a plurality of threaded holes in the flange 15. A resilient sleeve 25 made of silicone rubber or some other suitable material is positioned around a portion of the bushing 14 and held in place by means of flange 16.

The base member 12 has an upstanding boss 28 with an axial bore 26 and small counter-bore 27 cut therein for the reception of a standoff member 31. The standoff member 31 is constructed of stainless steel or other material of suitable stiffness so that it will not bend upon the application of appreciable dynamic loading and has an enlarged portion 32 including a flange 33 which fits into axial bore 26 and rabbeted portion 27 of the boss 28. The standoff 31 is held in place by means of a locknut 34 which engages threads on a reduced portion 35 of the standoff member 31. When the locknut 34 is tightened, it draws the flange 33 down tight against the shoulder 27. The standoff 31 is prevented from rotating within the axial bore 26 by means of a setscrew 36.

A beam or spring 37 having enlarged end portions 38 and 41 is held in place within the standoff 31 by means of a cap nut 42 which forces enlarged end portion 38 against a shoulder in the reduced portion 35 of the standoff member 31. The beam or spring 37 is made from a beryllium copper cold drawn bar or any other suitable spring material having a high tensile strength. The spring or beam 37 is provided with a threaded portion 43 which is adapted to be pressed through the axial bore 18 in the bushing 14, and is fastened in the bushing 14 by means of a lock nut 44. It should be noted that the longitudinal axis of the enlarged end portion 41 is restrained from any angular displacement by the bushing 14, hence the slope of the beam at this end will be zero with respect to this longitudinal axis after loading, and therefore the bushing 14 provides a fixed joint for the enlarged end portion 41. The axis of the other enlarged end portion 38 is similarly restrained against rotation with respect to reduced portion 35 of standoff member 31 by means of the cap nut 42, and therefore a fixed joint is provided between the enlarged portion 38 of the spring 37 and the standoff member 31.

In order to have true double cantilever action, however the longitudinal axis of both enlarged end portions must have zero slope with respect to their original positions after loading. It is evident from an inspection of Fig. 1 and the explanation given above that the longitudinal axis of enlarged end portion 41 is so restrained, but that the slope of the axis of enlarged end portion 38 will be determined by the slope of the longitudinal axis of standoff member 31 and when a load is applied to member 12, the slope of the axis of the standoff member will change and the slope of the axis of enlarged end portion 38 will be changed accordingly. It has been found that if three of the double cantilever beam assemblies are used, not all located on a straight line, true double cantilever action results and hence the slope of the longitudinal axis passing through enlarged end portion 38 and the slope of the longitudinal axis passing through enlarged end portion 41 after loading of the beam will be zero with respect to the longitudinal axis of the beam before loading. Since the slope of the beams 37 at enlarged end portions 38 and 41 remain zero with respect to the longitudinal axis of the beams before loading, despite a displacement of one end portion relative to the other, and there is a fixed joint at each end of the beams in relation to members 12 and 13 it is clear that a plane passing through base member 12 which is parallel to a plane passing through structural member 13 will remain parallel thereto when member 12 is displaced relative to member 13. Therefore, at least three of the double cantilever beam assemblies must be used to isolate an object from vibrations while maintaining a reference plane passing the object parallel to a reference plane passing through the structural member upon which the object is mounted.

Figure 4:
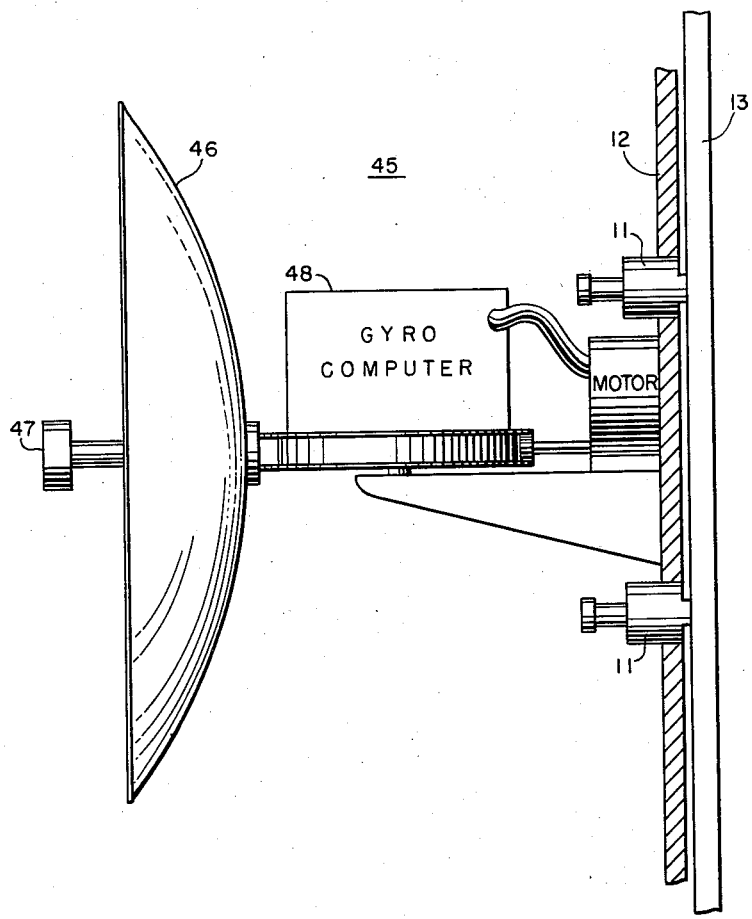
Fig. 4 shows a gyroscopically controlled antenna mounted on the structural member and double cantilever beam assemblies of Fig. 3.

Fig. 3 shows a typical application in which three of the double cantilever beam assemblies 11, are mounted in a structural A frame of an aircraft. As shown in Figs. 1 and 4 the base member of the object to be isolated from vibrations is mounted on the standoff member 31. The particular beam assembly shown in Fig. 1 is peculiarly adapted for use in situations where space is at a premium. As a result of the mounting assembly of Fig. 1 the base member 12 can be positioned very close to the structural member 13.

As can be seen by reference to Fig. 1, the weight of the object to be isolated from vibration is supported by means of the spring 37 which is rigidly attached at one end to the structural member 13 by means of the bushing 14 and lock nut 44, and rigidly attached to the base member 12 at the other end through standoff member 35 and cap nut 42. When three or more of the beam assemblies 11 are used as shown in Fig. 3, a lateral displacement of the structural member 13 will cause the beams 37 to deflect in a double cantilever beam action, the two enlarged end portions 38 and 41 will be displaced relative to one another but a longitudinal axis passing through the end portion 41 will remain parallel to a longitudinal axis passing through the end portion 38. The beam will actually flex only in the center portion which has a reduced diameter.

Under ordinary vibration conditions it is contemplated that the displacement between members 12 and 13 will not exceed the distance between the outer dimension of resilient sleeve 25 and the inner dimension of the enlarged portion 32 of standoff member 31, however, if exceedingly large shocks are applied which causes a displacement in excess of this distance, the resilient sleeve will absorb some of this shock and prevent the spring or beam 37 from becoming overstressed.

As pointed out previously, the invention is particularly useful in isolating a radar antenna from environmental shocks and vibrations. Referring now to Fig. 4 there is shown the structural member 13 which can be considered as attached to a vehicle, for example an airplane, which has a radar antenna generally designated by the numeral 45 mounted thereon by means of a plurality of the cantilever beam or spring assemblies 11. The antenna base member such as a base member 12 is mounted on the structural member 13 by at least three double cantilever beam assemblies 11 shown in detail in Fig. 1. In addition the base member has attached thereto a parabolic antenna reflector 46 and feed horn 47 controlled by a gyrocomputer 48. A line drawn through the axis of the parabolic reflector is known in the parlance of those skilled in the art as the bore-sight of the antenna. It is apparent that the structure shown in Fig. 4 will isolate the antenna 45 and will simultaneously prevent any shift in the bore-sight. As the antenna is displaced relative to the structural member 13, the base member 12 will remain parallel to its original position with respect to the structural member 12 and in turn the bore-sight will remain parallel to its original position.

As mentioned earlier in the specification, the springs or beams 37 must be very stiff in the axial direction and the need for such stiffness can readily be appreciated by reference to Fig. 4. It can be seen by reference to this figure that the center of gravity of the antenna system is a considerable distance from the base member 12 and as the system is subjected to vibrations some of the springs or beams 37 will be placed in tension and others will be placed in compression. For example, if the center of gravity of the antenna system is located somewhere within the gyrocomputer and if a downward load is placed on the system because of vibrations or shocks, the spring or beam 37 located within the upper assembly 11 will be stressed in tension, whereas the springs 37 in lower assemblies 11 will be subjected to axial compressive forces. Conversely, if an upward load is placed on the antenna system through the center of gravity, axial compressive forces will be placed upon the spring or beam 37 located in the assembly 11 at the top of the drawing and the springs or beams 37 located in the assemblies 11 at the bottom of the drawing will be placed in compression.

These compressive and tension forces are applied parallel to the longitudinal axis of the beams 37 and are in addition to the forces applied perpendicular to the longitudinal axis of the beam which cause the beams to deflect in a double cantilever action. The springs or beams 37 must be very stiff in an axial direction to prevent appreciable lengthening of the beams that are subjected to forces in tension and to prevent appreciable shortening of those subjected to axial compressive forces. This axial stiffness prevents such lengthening and shortening and this coupled with the double cantilever action of the beams maintains the plane of the base member 12 parallel to the plane of structural member 13. For purposes of illustration and by way of example only, the spring constant of the beam 37, calculated for displacement perpendicular to the longitudinal axis, may be on the order of 1300 lbs./in. whereas the spring constant, calculated for displacement parallel to the longitudinal axis, may be on the order of 333,000 lbs./in.

Thus, this invention provides a sturdy reliable vibration isolation system which will effectively isolate an object from environmental vibrations and shocks, and will simultaneously maintain a reference plane passing through the object parallel to a reference plane passing through a structural member upon which the object is mounted.

It should be understood of course, that the foregoing disclosure relates to only a preferred embodiment of the invention and that it is intended to cover all changes and modification of the example of the invention herein chosen for the purposes of the disclosure, which do not constitute departures from the spirit and scope of the invention.

What is claimed is:

1. In a vibration isolation system, an assembly for mounting an object on a structural member comprising an elongated spring member having a first and a second enlarged end portion, an elongated bushing having an axial bore therein secured to said structural member, the first enlarged end portion of said spring rigidly secured in said axial bore, a second bushing secured to said object to be isolated from vibration and having a first portion with an axial bore therein and a reduced portion with an axial bore therein, the second enlarged end portion of said spring secured in the axial bore of said reduced portion and the first portion of said second bushing coaxially mounted in spaced relationship over a portion of said first bushing.

2. In a vibration isolation system, an assembly for suspending an object to be isolated from vibration on a structural member comprising an elongated cylindrical spring member having a first and a second enlarged end portion and a central portion of reduced diameter, an elongated cylindrical bushing having an axial bore therein and an external flange, means for securing the first enlarged end portion of said spring member in said axial bore and means for securing said external flange to said structural member, a cylindrical standoff member having a first portion with an axial bore therein and a second portion of reduced diameter having an axial bore therein, said first portion positioned in coaxially spaced relationship over a portion of said elongated cylindrical bushing, and means for securing said object to be isolated from vibration to the external surface of the first portion of said cylindrical standoff member, and means for rigidly securing the second enlarged end portion of said elongated spring to the end of the reduced portion of the cylindrical standoff.

3. In a vibration isolation system an assembly for suspending an object to be isolated from vibration on a structural member comprising a cylindrical spring member having a first and a second enlarged end portion and a central portion of reduced diameter, a first cylindrical bushing having an axial bore coaxially mounted over the first enlarged end portion and a part of said central portion of said spring member, means for securing said spring member to said bushing, means for securing said bushing to said structural member, a second cylindrical bushing having a first portion with an axial bore therein and a second portion of reduced diameter with an axial bore therein, said first portion coaxially positioned in spaced relationship over a portion of said first cylindrical bushing, said second portion coaxially positioned in spaced relationship around the central portion of said spring member and secured to the second enlarged end portion of said spring, and means for securing the object to be isolated from vibration on the first portion of said second cylindrical bushing.

4. The vibration isolation system of claim 3, in which a resilient cylindrical sleeve is coaxially positioned over said first cylindrical bushing.

5. In a vibration isolation system for mounting a radar antenna on a vehicle, a structural member adapted to be rigidly secured to said vehicle, a base member, an antenna system secured to said base member, spring means for suspending said base member from said structural member and means associated with said spring means for maintaining a reference plane passing through said antenna system parallel to a reference plane passing through said structural member.

6. In a vibration isolation system for mounting a radar antenna on a vehicle, a structural member adapted to be rigidly secured to said vehicle, a base member, an antenna system comprising a reflector and a feed horn secured to said base member, at least three double cantilever flexible beams rigidily attached at one end to said structural member and rigidly attached at the other end to said base member.

7. A vibration isolation system for isolating a radar antenna from environmental vibrations and shocks without permitting a shift in bore-sight, comprising a structural member for mounting said antenna, a base member, an antenna system having a reflector and a feed horn secured to said base member, at least three cylindrical metal spring members, each of said spring members having a first and a second enlarged end portion and a central portion of reduced diameter, means for rigidly securing the first enlarged end portions of spring members to said base member, and means for rigidly securing the second enlarged end portions of said spring members to said structural member, whereby said spring members act as double cantilever beams to isolate the antenna from vibration and simultaneously maintain the axis of said feed horn parallel to an original given position with respect to said structural member.

8. In a vibration isolation system for isolating an object from environmental vibrations suffered by a structural member on which it is mounted, at least three elongated cylindrical beams, each beam having a first enlarged end portion and a second enlarged end portion, means for providing a fixed joint between the first enlarged end portions of each of said beams and said structural member comprising a cylindrical bushing rigidly secured to said structural member and having an axial bore therein, said first enlarged end portion of said beam positioned within said axial bore and rigidly secured to said cylindrical bushing, means for providing a fixed joint between the second enlarged end portion of each of said beams and said object comprising a cylindrical standoff having a first portion with an axial bore therein rigidly secured to said object to be isolated from vibration and coaxially positioned in spaced relationship over a portion of said cylindrical bushing, and a second portion of reduced diameter having an axial bore therein rigidly secured to the second enlarged end portion of said beam.

References Cited in the file of this patent

UNITED STATES PATENTS 2,540,832    Piron ------------------ Feb. 6, 1951